(12) United States Patent  
Tanaka et al.

(10) Patent No.: US 9,863,462 B2  
(45) Date of Patent: Jan. 9, 2018

(54) HALF THRUST BEARING AND BEARING DEVICE FOR CRANKSHAFT OF INTERNAL COMBUSTION ENGINE

(71) Applicant: Daido Metal Company Ltd., Naka-ku, Nagoya (JP)

(72) Inventors: Shiho Tanaka, Inuyama (JP); Motohiko Koushima, Inuyama (JP)

(73) Assignee: DAIDO METAL COMPANY LTD., Nagoya-shi (JP)

( * ) Notice: Subject to any disclaimer, the term of this patent is extended or adjusted under 35 U.S.C. 154(b) by 0 days.

(21) Appl. No.: 15/377,282

(22) Filed: Dec. 13, 2016

(65) Prior Publication Data

US 2017/0167530 A1   Jun. 15, 2017

(30) Foreign Application Priority Data

Dec. 15, 2015   (JP) ................. 2015-244296

(51) Int. Cl.

| | |
|---|---|
| *F16C 9/02* | (2006.01) |
| *F16C 17/10* | (2006.01) |
| *F16C 33/12* | (2006.01) |
| *F16C 17/04* | (2006.01) |
| *F16C 33/04* | (2006.01) |

(52) U.S. Cl.  
CPC ............. *F16C 9/02* (2013.01); *F16C 17/04* (2013.01); *F16C 17/10* (2013.01); *F16C 33/046* (2013.01); *F16C 33/122* (2013.01); *F16C 2240/30* (2013.01); *F16C 2360/22* (2013.01)

(58) Field of Classification Search  
CPC .................................. F16C 9/02; F16C 17/04  
See application file for complete search history.

(56) References Cited

U.S. PATENT DOCUMENTS

| | | | | |
|---|---|---|---|---|
| 6,149,310 A | * | 11/2000 | Ono ................. | F02F 7/0053 384/294 |
| 9,188,159 B2 | * | 11/2015 | Tanaka ............. | F16C 33/046 |
| 2010/0260449 A1 | * | 10/2010 | Lehmann .......... | F16C 9/00 384/456 |

FOREIGN PATENT DOCUMENTS

| | | |
|---|---|---|
| JP | 11-201145 | 7/1999 |
| JP | 2001-323928 | 11/2001 |

* cited by examiner

*Primary Examiner* — Thomas R Hannon  
(74) *Attorney, Agent, or Firm* — Harness, Dickey & Pierce, P.L.C.

(57) ABSTRACT

There is provided a half thrust bearing having a semicircular-ring shape for a crankshaft of an internal combustion engine, including a back metal layer and a bearing alloy layer having a slide surface on which thrust reliefs are formed adjacently to both circumferential end surfaces so that a wall thickness of the half thrust bearing becomes thinner from the slide surface toward the circumferential end surfaces. A thrust relief length L1 of each thrust relief extends over a circumferential angle θ1 from the circumferential end surface toward a circumferential central portion, and is constant between an inside end portion and an outside end portion in a radial direction of the half thrust bearing. A flat surface of each thrust relief includes a first region on the circumferential end surface side and a second region on the circumferential central portion side.

7 Claims, 8 Drawing Sheets

HALF THRUST BEARING AND BEARING DEVICE FOR CRANKSHAFT OF INTERNAL COMBUSTION ENGINE

CROSS-REFERENCE TO RELATED APPLICATION

This application is based on and claims the benefit of priority from Japanese Patent Application No. 2015-244296 filed on Dec. 15, 2015. The entire disclosure of the above application is incorporated herein by reference.

BACKGROUND OF THE INVENTION

The present invention relates to a bearing device for receiving axial force of a crankshaft of an internal combustion engine.

A crankshaft of an internal combustion engine is rotatably supported at its journal portion by a cylinder block lower portion of the internal combustion engine via a main bearing which is configured by combining a pair of half bearings into a cylindrical shape.

One or both of the pair of half bearings are used by being combined with a half thrust bearing(s) which receives the axial force of the crankshaft. The half thrust bearing(s) is placed at one or both of axial end surfaces of the half bearing.

The half thrust bearing receives the axial force which occurs to the crankshaft. That is, the half thrust bearing is disposed for the purpose of supporting the axial force which is inputted into the crankshaft when the crankshaft is connected with a transmission by a clutch or the like.

On slide surface sides in vicinities of both circumferential ends of the half thrust bearing, thrust reliefs are formed so that the thickness of a bearing member becomes thinner toward a circumferential end surface. In general, the thrust relief is formed so that the length from the circumferential end surface of the half thrust bearing to the slide surface and the depth at the circumferential end surface are constant irrespective of the position in a radial direction. The thrust relief is formed to absorb a positional deviation of the end surfaces of a pair of half thrust bearings at when the half thrust bearings are assembled into a divided type bearing housing (see FIG. 10 of JP-A-H11-201145).

The crankshaft of the internal combustion engine is supported at its journal portion by the cylinder block lower portion of the internal combustion engine via the main bearing formed by a pair of half bearings. At this time, lubricating oil is fed into a lubricating oil groove which is formed along an inner circumferential surface of the main bearing through a through-port in a wall of the main bearing, from an oil gallery in a cylinder block wall. The lubricating oil is supplied into the lubricating oil groove of the main bearing in this way, and thereafter is supplied to the half thrust bearing. Note that for the thrust bearing which receives the axial force of the crankshaft of the internal combustion engine, a laminated structure in which an aluminum bearing alloy layer or a copper bearing alloy layer is formed on one surface of a back metal layer of an Fe alloy is generally used.

Incidentally, in recent years, oil pumps of internal combustion engines for supplying lubricating oil are downsized, and therefore the amount of the lubricating oil supplied to bearings have decreased. Accordingly, the amount of leakage of the lubricating oil from the end surfaces of the main bearings also decrease, and therefore the amount of the lubricating oil supplied to the half thrust bearings tends to decrease. As countermeasures against this, there is proposed an art of enhancing oil retentivity for lubricating oil by forming a plurality of fine grooves side by side on the slide surface of the half thrust bearing, for example (see to JP-A-2001-323928).

SUMMARY OF THE INVENTION

Further, in recent years, in order to reduce the weight of the internal combustion engines, shaft diameters of the crankshafts have been reduced, so that the crankshafts have lower rigidity than conventional crankshafts. Consequently, deflection easily occurs to the crankshafts at the time of operation of the internal combustion engines, and vibration of the crankshafts tends to become large. Accordingly, the slide surface of the half thrust bearing and a thrust collar surface of the crankshaft directly contact each other, so that damage (seizure) easily occurs.

JP-A-2001-323928 discloses a configuration of supplying lubricating oil to a substantially entire surface of the bearing surface by providing an oil groove on the slide surface. However, even when the art of JP-A-2001-323928 is adopted, if the vibration due to the deflection of the crankshaft described above is large, it is difficult to prevent the slide surface which is in proximity of the thrust relief on the rear side in a crankshaft rotational direction of the half thrust bearing from contacting the thrust collar of the crankshaft. Consequently, seizure is likely to occur to the slide surface of the half thrust bearing.

Further, when the axial force which is inputted to the crankshaft by connection between the crankshaft and the transmission or the like is applied to the slide surface of the half thrust bearing, impulsive force is repeatedly applied to the vicinities of the circumferential end surfaces of the half thrust bearing, and therefore fatigue (a crack and peeling) may occur to the thrust relief or the bearing alloy on the slide surface which is adjacent to the thrust relief.

In more detail, the half thrust bearing is used by being fitted to a bearing seat (seating face) which is provided in a cylinder block and a side surface of a bearing cap, and the inside diameter of the bearing seat is formed to be slightly larger than the outside diameter of the half thrust bearing, so that the half thrust bearing is movable slightly in the circumferential direction. When a pair of half thrust bearings are used by being combined into a ring shape (see FIG. 10 of JP-A-H11-201145, for example), the thrust collar surface of the crankshaft tends to contact the slide surface of one of the half thrust bearings first, instead of simultaneously contacting the slide surfaces of both the pair of half thrust bearings, at the instant when the axial force from the crankshaft is inputted to the slide surface of the thrust bearing. Consequently, the one of the half thrust bearings slightly moves in the circumferential direction with rotation of the thrust collar surface, and the circumferential end surface on the front side in the crankshaft rotational direction of the one of the half thrust bearings collides with the circumferential end surface on the rear side in the crankshaft rotational direction of the other half thrust bearing, and an impulsive load is repeatedly applied to the vicinities of the circumferential end surfaces of these half thrust bearings. Due to the influence of the impulsive load, fatigue (a crack and peeling from a steel back metal layer) easily occurs to the thrust relief adjacent to the circumferential end surface of the half thrust bearing or the bearing alloy layer on the slide surface which is adjacent to the thrust relief.

Accordingly, an object of the present invention is to provide a half thrust bearing for a crankshaft and a bearing device to which seizure and fatigue hardly occur at the time of operation of an internal combustion engine.

In order to achieve the above described object, a half thrust bearing for a crankshaft of an internal combustion engine provided by the present invention is a half thrust bearing having a semicircular-ring shape for receiving axial force of a crankshaft of an internal combustion engine, including a back metal layer made from an Fe alloy and a bearing alloy layer, the bearing alloy layer including a slide surface on an opposite side to the back metal layer, thrust reliefs being formed adjacently to both circumferential end surfaces of the half thrust bearing, each thrust relief including a flat surface formed so that a wall thickness of the half thrust bearing becomes thinner from the slide surface toward the circumferential end surface, characterized in that a thrust relief length (L1) of each thrust relief at an inside end portion in a radial direction of the half thrust bearing extends in the range of a circumferential angle ($\theta1$) more than 25° and less than or equal to 45° from the circumferential end surface toward a side of a circumferential central portion of the half thrust bearing, the thrust relief length (L1) is constant between the inside end portion and an outside end portion in the radial direction of the half thrust bearing, and the surface of each thrust relief includes a first region on a side of the circumferential end surface and a second region on a side of the circumferential central portion, the first region consisting of a surface on which the back metal layer is exposed, the second region consisting of a surface on which the bearing alloy layer is exposed, a length (L2) of the first region from the circumferential end surface that is parallel with the thrust relief length (L1) is 8 mm to 18 mm.

Further, in order to achieve the above described object, a bearing device for a crankshaft of an internal combustion engine which is provided by the present invention includes:

a crankshaft;

a pair of half bearings which supports a journal portion of the crankshaft, each half bearing comprising crush reliefs formed on its inner circumferential surface adjacently to both circumferential end portions of the half bearing;

a bearing housing in which a holding hole for holding the pair of half bearings is formed so as to penetrate through the bearing housing; and at least one half thrust bearing having semicircular-ring shape described above, the half thrust bearing being arranged on an axial end surface of the bearing housing adjacently to the holding hole for receiving axial force of the crankshaft, characterized in that at least the thrust relief of the half thrust bearing on a rear side in a rotational direction of the crankshaft is formed so that the thrust relief length at the inside end portion in the radial direction of the half thrust bearing is longer than a crush relief length at a corresponding axial end portion of the half bearing.

In the above described configuration, the crankshaft is intended to be a member including a journal portion, a crankpin portion and a crank arm portion. Further, the half thrust bearing is intended to be a member having a shape obtained by dividing a circular ring shape into substantially halves, but is not intended to be strictly a half.

Furthermore, at least one half thrust bearing can be disposed on the axial end surface of the bearing housing so as to be adjacent to the holding hole as described above, or one or two half thrust bearings can be disposed on the respective end surfaces in the axial direction. Further, the half thrust bearing can be also used by being combined with another conventional half thrust bearing.

The half thrust bearing and the bearing device for the crankshaft of the present invention receive the axial force of the crankshaft of the internal combustion engine. The thrust relief is formed so that the thrust relief length (L1) from the circumferential end surface of the half thrust bearing becomes a length corresponding to the circumferential angle ($\theta1$) more than 25° and less than or equal to 45° toward the side of the circumferential central portion at the inside end portion in the radial direction of the half thrust bearing, and is formed so that the thrust relief length (L1) becomes longer than the crush relief length in the corresponding axial end portion of the half bearing, at the inside end portion in the radial direction of the half thrust bearing. By the configuration, the lubricating oil which flows out from the crush relief clearance of the half bearing easily flows into the thrust relief clearance on the rear side of the half thrust bearing in the rotational direction of the crankshaft, and a large amount of the lubricating oil is fed to the slide surface of the half thrust bearing, so that even when deflection occurs to the crankshaft at the time of operation of the internal combustion engine and vibration becomes large, the slide surface of the half thrust bearing and the thrust collar surface of the crankshaft hardly contact each other directly, and damage to the slide surface of the half thrust bearing hardly occurs.

Furthermore, the surface of the thrust relief of the half thrust bearing has the first region which is located on the side of the circumferential end surface of the half thrust bearing and is formed of the surface on which the back metal layer is exposed, and the second region which is located on the side of the central portion in the circumferential direction and is formed of the surface on which the bearing alloy layer is exposed, and the length (L2) of the first region from the circumferential end surface of the half thrust bearing that is parallel with the thrust relief length (L1), is made 8 to 18 mm. By this configuration, the impulsive load which is applied to the vicinity of the circumferential end surface of the half thrust bearing at substantially the same time as the axial force from the crankshaft is applied to the slide surface of the half thrust bearing does not reach the bearing alloy layer of the thrust relief, and fatigue does not occur to the bearing alloy layer.

DESCRIPTION OF THE EMBODIMENTS

Hereinafter, an embodiment of the present invention will be described with reference to the drawings.

Embodiment 1

(Entire Configuration of Bearing Device)

Figure 1:
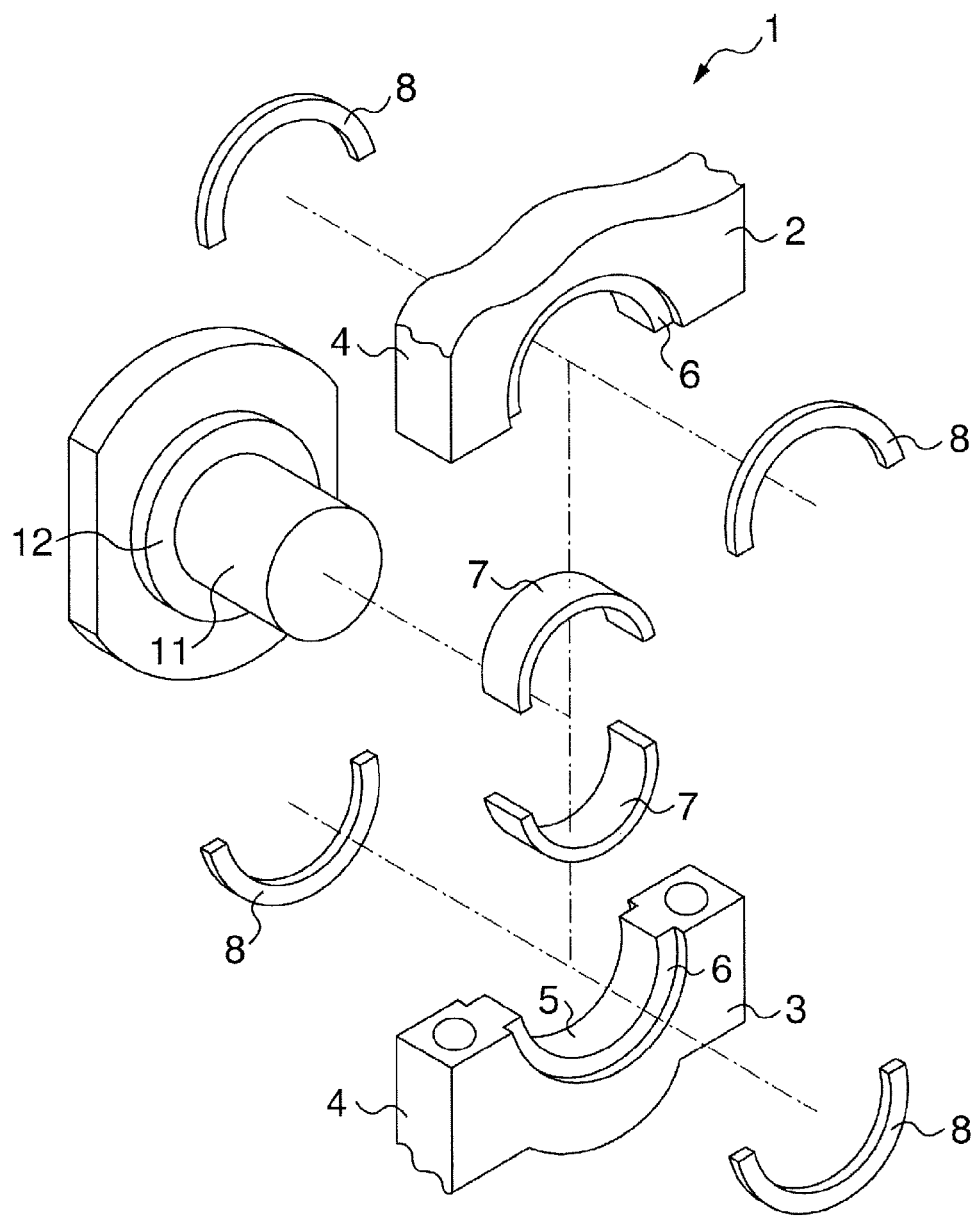
FIG. 1 is an exploded perspective view of a bearing device.
Figure 2:
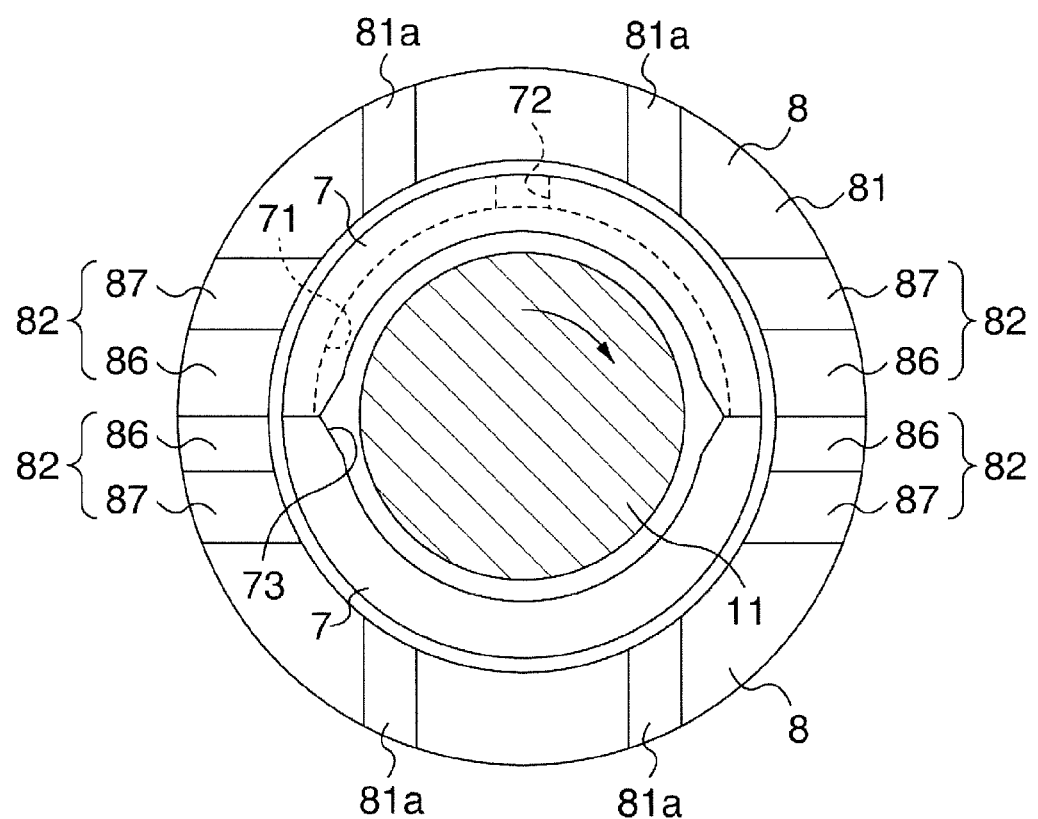
FIG. 2 is a front view of the bearing device.
Figure 3:
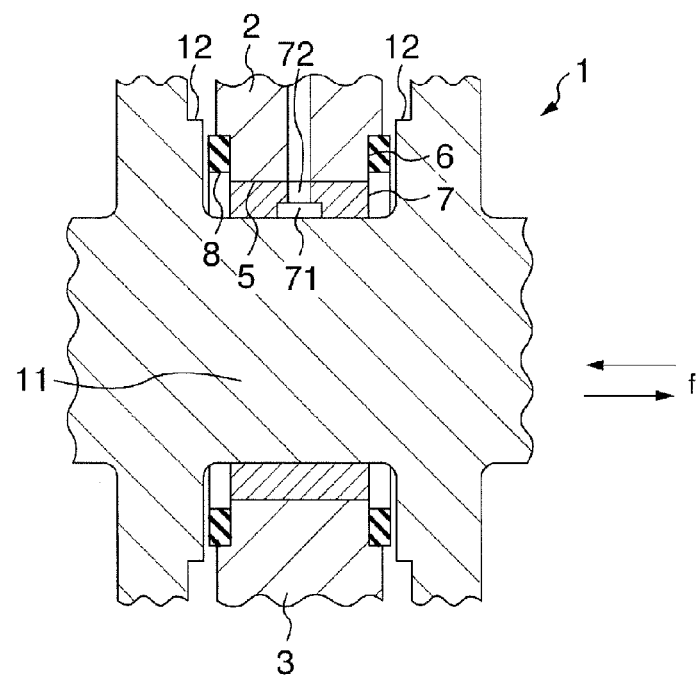
FIG. 3 is a sectional view of the bearing device.

First, an entire configuration of a bearing device 1 of the present invention will be described with use of FIGS. 1 to 3. As illustrated in FIGS. 1 to 3, in a bearing housing 4 which is configured by mounting a bearing cap 3 onto a lower portion of a cylinder block 2, a bearing hole (holding hole) 5 which is a circular hole which penetrates between both side surfaces are formed, and bearing seats 6 and 6 which are ring-shaped recessed portions are formed on a circumferential edge of the bearing hole 5 on the side surface. Half bearings 7 and 7 which rotatably support a journal portion 11 of a crankshaft are combined into a cylindrical shape and are fitted in the bearing hole 5. Half thrust bearings 8 and 8 which receive force f (see FIG. 3) in an axial direction via a thrust collar 12 of the crankshaft are combined into a ring shape and are fitted to the bearing seats 6 and 6.

Figure 6:
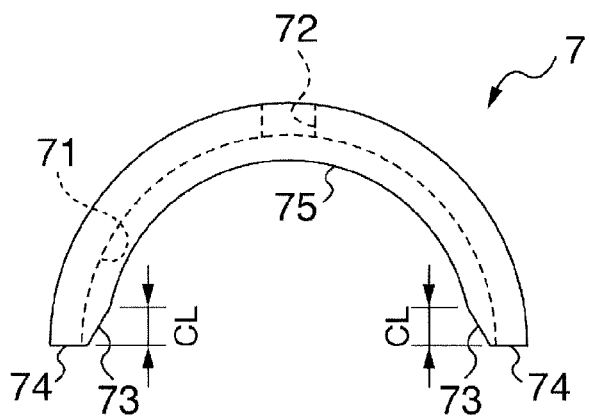
FIG. 6 is a front view of the half bearing of embodiment 1.
Figure 7:
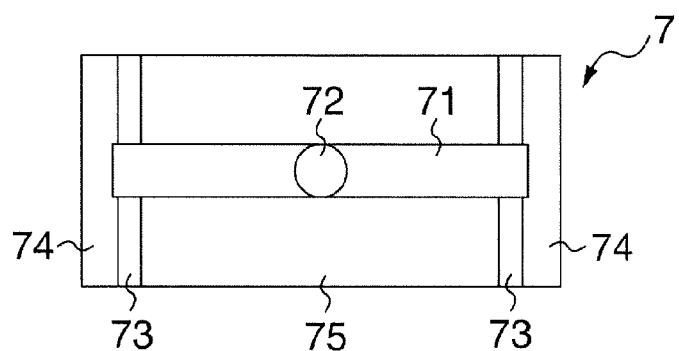
FIG. 7 is a bottom view of the half bearing in FIG. 6 seen from an inside in a radial direction.

As illustrated in FIG. 2, a lubricating oil groove 71 is formed on an inner circumferential surface of the half bearing 7 on a cylinder block 2 side (upper side) of the half bearings 7 which configure a main bearing, and a through-hole 72 which penetrates to an outer circumferential surface is formed in the lubricating oil groove 71 (see FIGS. 6 and 7). Note that the lubricating oil grooves may be also formed in both upper and lower half bearings.

Further, in the half bearing 7, crush reliefs 73 and 73 are formed at both circumferential end portions to be adjacent to abutment surfaces of the half bearings 7 (see FIG. 2). The crush relief 73 is a wall thickness reduction region which is formed so that the wall thickness of a region adjacent to the circumferential end surface of the half bearing 7 becomes gradually thinner toward the circumferential end surface. The crush relief 73 is formed with the intention of absorbing positional deviation and deformation of butting surfaces when the pair of half bearings 7 and 7 are assembled.

(Configuration of Half Thrust Bearing)

Figure 15:
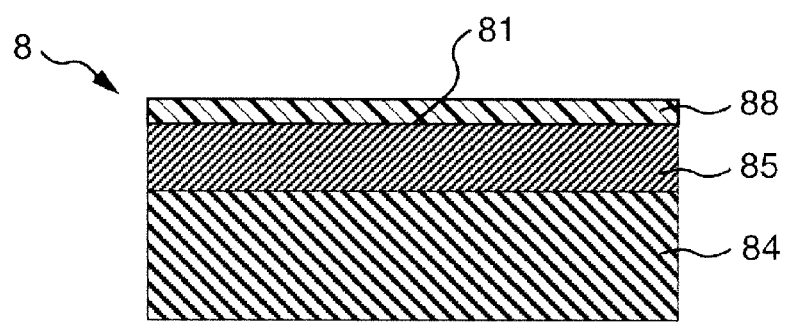
FIG. 15 is a sectional view of a half thrust bearing in which an overlay layer is formed on a bearing alloy layer.

Next, a configuration of the half thrust bearing 8 of the first embodiment will be described with use of FIGS. 2 to 5. The half thrust bearing 8 of the present embodiment is formed into a flat plate having a semicircular-ring shape by a bimetal in which a thin bearing alloy layer 85 is bonded to a back metal layer 84 made of an Fe alloy. Note that as the Fe alloy of the back metal layer 84, steel, stainless steel or the like can be used. Further, as the bearing alloy layer 85, a Cu bearing alloy, an Al bearing alloy or the like can be used. As illustrated in FIG. 15, an overlay layer 88 can be also formed on a surface which is a slide surface 81 of the bearing alloy layer 85. The half thrust bearing 8 includes the slide surface 81 (bearing surface) which is formed of the bearing alloy layer 85 in a central region, and thrust reliefs 82 and 82 in regions which are adjacent to end surfaces 83 and 83 on both sides in the circumferential direction, and the thrust relief 82 is configured by a flat surface (plane). In order to enhance oil retentivity for the lubricating oil, two oil grooves 81a and 81a are formed between the thrust reliefs 82 and 82 on both sides on the slide surface 81.

As the overlay layer 88, it is possible to use metal or alloy such as Sn, Sn alloy, Bi, Bi alloy, Pb or Pb alloy, or a resin slide material. The resin slide material is formed from a resin binder and a solid lubricant. While a known resin can be used as the resin binder, it is preferable to use one or more of a polyamide-imide, a polyimide and a polybenzimidazole which have high heat resistance. Further, as the resin binder, it is possible to use a resin composition obtained by mixing a resin with high heat resistance which consists of one or more of a polyamide-imide, a polyimide and a polybenzimidazole, and 1 to 25 volume % of a resin consisting of one or more of a polyamide, an epoxy and a polyether sulfone, or a resin composition having been made a polymer alloy. As the solid lubricant, it is possible to use molybdenum disulfide, tungsten disulfide, graphite, polytetrafluoroethylene, boron nitride or the like. An addition ratio of the solid lubricant to the resin slide material is preferably 20 to 80 volume %. Further, in order to enhance abrasion resistance of the resin slide material, hard particles of ceramics, and an intermetallic compound may be included by 0.1 to 10 volume % with respect to the resin slide material.

Further, the overlay layer 88 may be added not only to a surface as the slide surface 81 of the bearing alloy layer 85 which bears the load in the axial direction of the crankshaft, but also to a surface of the thrust relief 82, a surface of the oil groove 81a, an outside diameter surface, an inside diameter surface, a rear surface and the like of the half thrust bearing 8. A thickness of the overlay layer 88 is 0.5 to 20 μm, and is desirably 1 to 10 μm.

The thrust reliefs 82 are wall thickness reduction regions which are formed in regions adjacent to both circumferential end surfaces and on the slide surface 81 side so that the wall thickness becomes gradually thinner toward the end surfaces, and extend throughout entire lengths in the radial direction of the circumferential end surfaces of the half thrust bearing 8. The thrust relief 82 is formed to relieve a positional deviation of the circumferential end surfaces 83 and 83 of the pair of half thrust bearings 8 and 8, which is due to a positional deviation or the like when the half thrust bearing 8 is assembled into the divided type bearing housing 4.

Figure 4:
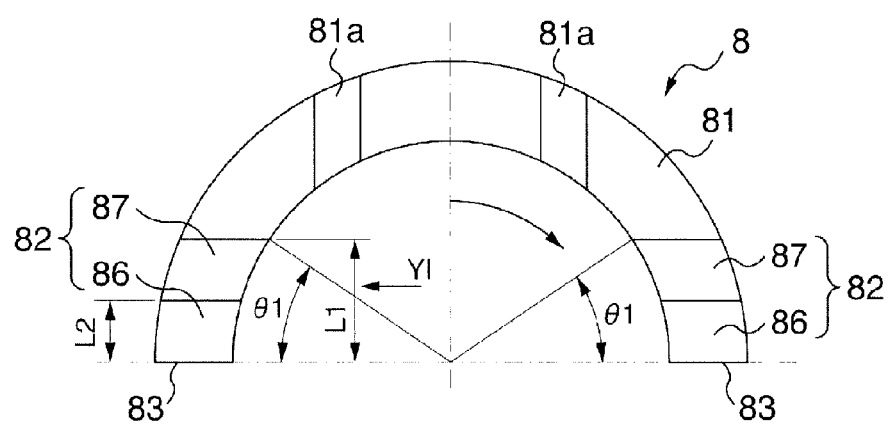
FIG. 4 is a front view of a half thrust bearing of embodiment 1.

As illustrated in FIG. 4, the thrust relief 82 of the present embodiment has a constant thrust relief length L1 between an inside end portion and an outside end portion in the radial direction of the surface of the thrust relief 82.

Here, the thrust relief length L1 means a length which is measured in a perpendicular direction from a plane (split plane) including both circumferential end surfaces 83 of the half thrust bearing 8. In particular, the thrust relief length L1 in the inside end portion is defined as a length in the perpendicular direction from the circumferential end surface of the half thrust bearing to a point at which the surface of the thrust relief 82 intersects an inner circumferential edge of the slide surface 81.

According to the present invention, the thrust relief length L1 is formed in the radial inside end portion of the half thrust bearing 8 so as to extend with a circumferential angle (θ1) more than 25° and less than or equal to 45° from the circumferential end surface 83 of the half thrust bearing 8 toward the central portion side in the circumferential direction.

In more detail, the thrust relief 82 has a first region 86 on the side of the circumferential end surface 83 of the half thrust bearing 8, which region is configured by a surface on which the back metal layer 84 is exposed, and a second region 87 adjacent to the first region 86 on the side of the circumferential central portion, which region is configured by a surface on which the bearing alloy layer 85 is exposed. In the case of using in a crankshaft (with a diameter of a journal portion of approximately 30 to 100 mm) for a compact internal combustion engine of a passenger car or the like, a length L2 of the first region 86 from the circumferential end surface 83 of the half thrust bearing 8, which is measured parallel with the thrust relief length L1, is 8 to 18 mm.

(Operational Effect by Thrust Relief Length L1)

In the configuration of the present embodiment, the thrust relief length L1 of the thrust relief 82 extends over the circumferential angle ($\theta 1$), which is more than 25° and is less than or equal to 45°, from the circumferential end surface 83 of the half thrust bearing 8 toward the circumferential central portion at the radial inside end portion of the half thrust bearing 8. Meanwhile, a crush relief length CL of the crush relief 73 of the half bearing 7 extends over up to a circumferential angle of 25° from a circumferential end surface 74 of the half bearing 7 toward the circumferential central portion of the half bearing 7. Consequently, oil which flows out from a clearance of the crush relief 73 of the half bearing 7 easily flows into a clearance between the surface of the thrust relief 82 of the half thrust bearing 8 and a surface of the thrust collar 12 of the crankshaft, and the oil which flows into there is supplied to the slide surface 81 of the half thrust bearing 8.

Further, as described above, substantially when the force f in the axial direction is inputted from the crankshaft to the slide surface 81 of the half thrust bearing 8, the circumferential end surface 83 of one of the half thrust bearings 8 and the circumferential end surface 83 of the other half thrust bearing 8 collide with each other, and an impulsive load is applied to the vicinities of the circumferential end surfaces 83 of the half thrust bearings 8. When the bearing seat 6 which is a ring-shaped recessed portion of the circumferential edge of the bearing hole 5 is formed only in the side surface of the cylinder block 2 in the bearing housing 4 which is configured by mounting the bearing cap 3 onto the lower portion of the cylinder block 2 illustrated in FIG. 1, and accordingly only a single half thrust bearing is arranged on one of the side surfaces of the bearing housing 4, unlike the configuration of the present embodiment, the circumferential end surface 83 of the half thrust bearing 8 collides with the end surface (split surface) of the bearing cap 3, and thereby an impulsive load is applied to the vicinity of the circumferential end surface 83 of the half thrust bearing 8.

In the configuration of the present embodiment, the thrust relief 82 of the half thrust bearing 8 has the first region 86 on the side of the circumferential end surface 83 of the half thrust bearing 8 which region 86 is configured by the surface on which the back metal layer is exposed, and the length L2 of the first region 86 from the circumferential end surface 83 of the half thrust bearing 8 is 8 to 18 mm. Consequently, even when the impulsive load is applied to the vicinity of the circumferential end surface 83 of the half thrust bearing 8, only the first region 86, that is, the back metal layer 84 portion of the thrust relief 82 mainly receives the influence of the impulsive load, and therefore fatigue does not occur to the bearing alloy layer 85 in the second region 87 on the side of the circumferential central portion of the thrust relief 82, and to the bearing alloy layer 85 of the slide surface 81 which is adjacent to the thrust relief 82.

The relationship between the thrust relief length L1 of the thrust relief 82 and the length L2 of the first region 86 is set preferably such that the thrust relief length L1 is 1.7 to 2.3 times the length L2 of the first region 86.

The region adjacent to the slide surface 81 on the surface of the thrust relief 82 may contact the thrust collar 12 surface of the crankshaft at the moment that the force f in the axial direction of the crankshaft is applied to the half thrust bearing 8, however, if the above described relationship is set, only the surface of the second region 87 having lubricity, that is, only the surface of the bearing alloy layer 85 on the surface of the thrust relief 82 contacts the thrust collar 12 surface, and the surface of the first region 86, that is, the back metal layer 84 can be prevented from contacting the thrust collar 12 surface. As a result, seizure hardly occurs to the half thrust bearing 8.

Although in the present embodiment, the length L2 of the first region 86 is made constant between the inside end portion and the outside end portion in the radial direction of the half thrust bearing 8, the length L2 may vary between the inside end portion and the outside end portion in the radial direction of the half thrust bearing 8, as long as the length L2 is within the range which satisfies the above described relationship.

Figure 5:
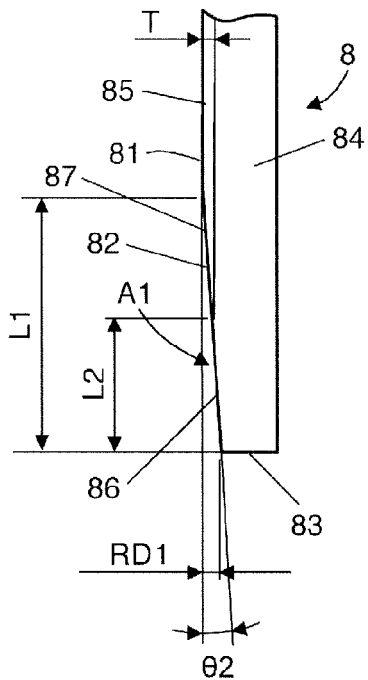
FIG. 5 is a side view of a thrust relief of the half thrust bearing of embodiment 1 seen from arrow YI in FIG. 4.

FIG. 5 illustrates a side surface of the vicinity of the circumferential end portion of the half thrust bearing 8 seen from an inside (in an arrow YI direction in FIG. 4).

As illustrated in FIG. 5, the surface of the thrust relief 82 of the half thrust bearing 8 is formed in such a manner that the wall thickness gradually becomes thinner toward the end surface. A thickness T of the bearing alloy layer 85 (in the slide surface 81 portion) of the half thrust bearing 8 is preferably 0.15 mm to 0.45 mm. In the thrust relief 82 of the present embodiment, at the time of producing the half thrust bearing 8, the bearing alloy layer 85 and the back metal layer 84 in the vicinities of both circumferential end surfaces 83 of the half thrust bearing 8 are simultaneously removed by cutting so that the first regions 86 configured by the surface on which the back metal layer 84 is exposed are formed on the surfaces of the thrust reliefs 82 on the sides adjacent to the circumferential end surfaces 83 of the half thrust bearing 8.

In the case of using in the crankshaft (the diameter of the journal portion of approximately 30 to 100 mm) of a compact internal combustion engine of a passenger car or the like, an angle $\theta 2$ formed between the slide surface 81 of the half thrust bearing 8 and the surface of the thrust relief 82 can be set at 0.5° to 2°.

Further, the thrust relief 82 of the half thrust bearing 8 is formed to have a constant depth RD1 in the axial direction between the inside end portion and the outside end portion in the radial direction, at the circumferential end surface 83. The depth RD1 in the axial direction of the thrust relief 82 can be set at 0.2 to 0.8 mm.

Here, the depth RD1 in the axial direction means a distance in the axial direction from a plane including the slide surface 81 of the half thrust bearing 8 to the surface of the thrust relief 82. In other words, the depth RD1 in the axial direction is a distance which is measured perpendicularly from a virtual slide surface obtained when the slide surface 81 is extended to above the thrust relief 82 and is defined as the virtual slide surface. The depth RD1 is defined as a depth from the surface of the thrust relief 82 to the slide surface 81, at the circumferential end surface 83 of the half thrust bearing 8.

Further, a sectional area A1 of the thrust relief clearance in the radial direction means an area of an extent enclosed by a thrust relief 82 surface at the inside end portion of the half thrust bearing 8, a virtual extension line obtained by extending the slide surface 81 to above the thrust relief 82, and a virtual extension line obtained by extending the end circumferential surface 83 of the half thrust bearing 8 to the thrust relief clearance, seen in the radial direction of the half thrust bearing 8.

In the present embodiment, two pairs of half thrust bearings 8, 8, 8 and 8 are placed on both sides in the axial direction of the pair of half bearings 7 and 7. Each of the half thrust bearings 8 is formed into a semicircular-ring shape, the center of the outside diameter of the half bearing 7 and the center of the outside diameter of the half thrust bearing 8 are located substantially coaxially, and a horizontal plane (split plane) including both circumferential end surfaces of the half bearing 7 and a horizontal plane (split plane) including both circumferential end surfaces of the half thrust bearing 8 are placed to be substantially parallel with each other.

Accordingly, as illustrated in FIG. 2, crush reliefs 73 of the half bearing 7 and the thrust reliefs 82 of the half thrust bearing 8 are in one to one correspondence with each other. That is, a crush relief clearance of the half bearing 7 and the thrust relief clearance of the half thrust bearing 8 are located in substantially the same circumferential angle position.

Hereinafter, a length relationship between the crush relief of the half bearing 7 and the thrust relief of the half thrust bearing 8 will be described. The half thrust bearing 8 of the present embodiment is configured so that the thrust relief length L1 at the radial inside end portion of the thrust relief 82 is longer than a crush relief length CL of the crush relief 73 of the corresponding half bearing 7. More desirably, the relationship between the thrust relief length L1 and the crush relief length CL at an inner diameter end portion in the radial direction is L1>CL×1.5.

Here, the length of the crush relief 73 means a height from a horizontal plane to an upper end of the crush relief 73 measured when the half bearing 7 is placed on the horizontal plane so that both circumferential end surfaces 74 and 74 become lower end surfaces as illustrated in FIG. 6, and in particular, the crush relief length CL means the length of the crush relief 73 at an axial end portion on a side where the half thrust bearing 8 is placed. In the present embodiment, although the crush relief length of the half bearing 7 is constant in the axial direction, the length of the crush relief 73 may vary in the axial direction of the half bearing 7.

In the configuration of the present embodiment, the lubricating oil which flows out from the clearance (an opening of the crush relief 73 at the axial end portion of the half bearing 7) of the crush reliefs 73 of the half bearing 7 easily flows into the thrust relief clearance of the half thrust bearing 8. If the thrust relief length L1 is shorter than the crush relief length CL on the contrary, the lubricating oil which flows out from the clearance of the crush relief 73 of the half bearing 7 flows also into a clearance between an outside diameter surface of the half bearing 7 and an inside diameter surface of the half thrust bearing 8.

In more detail, when the thrust relief length L1 of the inside diameter end portion of the half thrust bearing 8 on the rear side in a rotational direction of the crankshaft is shorter than the length CL of the crush relief 73 located in the corresponding position of the half bearing 7, a part of lubricating oil which flows out from the clearance of the crush relief 73 of the half bearing 7 flows out from the clearance in the vicinity of the circumferential end portion of the crush relief 73 on the side adjacent to the slide surface 75 of the half bearing 7, and does not flow into the clearance of the thrust relief 82 of the half thrust bearing.

As above, in the bearing device 1 of the present invention, the lubricating oil which flows out from the crush relief clearance of the half bearing 7 easily flows into the thrust relief clearance of the half thrust bearing 8 on the rear side in the rotational direction of the crankshaft, and therefore, a large amount of lubricating oil is fed to the slide surface 81 side of the half thrust bearing 8. By the large amount of lubricating oil, the slide surface 81 of the half thrust bearing 8 and the thrust collar 12 surface of the crankshaft hardly contact each other directly.

The surface of the thrust relief 82 can be configured by a plane as described above, however, it should be avoided to form a plurality of thin grooves side by side on the surface of the thrust relief 82 as described in JP-A-2001-323928, for example, preferably.

The reason of the above is that side surfaces of respective recessed portions of the plurality of thin grooves (side surfaces of the recessed portions of the thin grooves in the case of being seen from the radial direction of the half thrust bearing) become a barrier or resistance to the lubricating oil which flows in from the inside in the radial direction of the half thrust bearing, and the amount of lubricating oil which flows into the thrust relief clearance becomes smaller as compared with the case where the surface of the thrust relief 82 is smooth. Especially in a region where the thrust relief clearance becomes narrow in the vicinity of a spot where the thrust relief 82 is adjacent to the slide surface 81, the side surface of the recessed portion of the thin groove becomes resistance, the lubricating oil hardly flows into the thrust relief clearance, and the effect provided by making the thrust relief length L1 of the half thrust bearing 8 longer than the crush relief length CL of the half bearing 7 is lost.

As a specific dimension of the crush relief 73 of the half bearing 7 in the present embodiment, in the case of using in the crankshaft (the diameter of the journal portion of approximately 30 to 100 mm) of a compact internal combustion engine of a passenger car or the like, a depth at the circumferential end surface 74 from the virtual extension surface obtained by extending the slide surface 75 to above the crush relief to the crush relief 73 can be set 0.01 to 0.1 mm, and the crush relief length CL can be set 2 to 10 mm.

Figure 8:
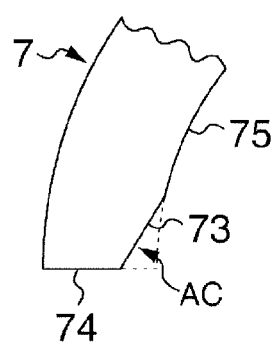
FIG. 8 is a front view of a crush relief of the half bearing of embodiment 1 seen from a front.

Next, with use of FIGS. 5 and 8, the relationship of sectional areas seen in the radial direction of the thrust relief clearance and the crush relief clearance will be described. In the half thrust bearing 8 of the present embodiment, the sectional area A1 of the thrust relief clearance at the radial inside end portion of the thrust relief 82 is made larger than a sectional area AC of the crush relief clearance of the corresponding crush relief 73 of the half bearing 7.

Here, the sectional area A1 of the thrust relief clearance means the area of the extent enclosed by the surface of the thrust relief 82 at the inside end portion of the slide surface 81, the virtual extension line obtained by extending the slide surface 81 to above the thrust relief 82, and the virtual extension line obtained by extending the end surface 83 in the circumferential direction of the half thrust bearing 8 to the thrust relief clearance, seen in the radial direction from the inside of the half thrust bearing 8 (FIG. 5). Further, the sectional area AC of the crush relief clearance means an area of an extent enclosed by the surface of the crush relief 73 at the end portion of the half bearing 7, a virtual extension line obtained by extending the slide surface 75 of the half bearing 7 to above the crush relief 73, and a horizontal line which connects the circumferential end surfaces 74 at both end portions of the half bearing 7, seen in the axial direction of the half bearing 7.

In the bearing device 1 of the present invention, the lubricating oil which flows out from the crush relief clearance of the half bearing 7 easily flows into the thrust relief clearance of the half thrust bearing 8 on the rear side in the rotational direction of the crankshaft, and therefore a large amount of lubricating oil is fed to the slide surface 81 side of the half thrust bearing 8. The large amount of lubricating oil makes it difficult for the slide surface 81 of the half thrust bearing 8 and the surface of the thrust collar 12 of the crank shaft to contact each other directly.

In the present embodiment, although the case is explained where the aforementioned relationship is established between the thrust reliefs 82 and 82 at both circumferential end portions of the half thrust bearing 8 and the crush reliefs 73 and 73 at both circumferential end portions of the half bearing 7 as illustrated in FIGS. 2 and 4, the present invention is not limited to this, and the aforementioned relationship only have to be established at least between the thrust relief 82 on the rear side in the rotational direction of the crankshaft and the crush relief 73 corresponding to this.

Further, in the present embodiment, although the bearing device 1 of the type in which the half bearing 7 and the half thrust bearing 8 are separated from each other is explained, the present invention is not limited to the above, and the present invention can be also applied to the bearing device 1 of a type in which the half bearing 7 and the half thrust bearing 8 are integrated.

Although the embodiment of the present invention is described in detail thus far with reference to the drawings, the specific configuration is not limited to the embodiment, and such a design change that does not deviate from the gist of the present invention is included in the present embodiment.

Figure 9:
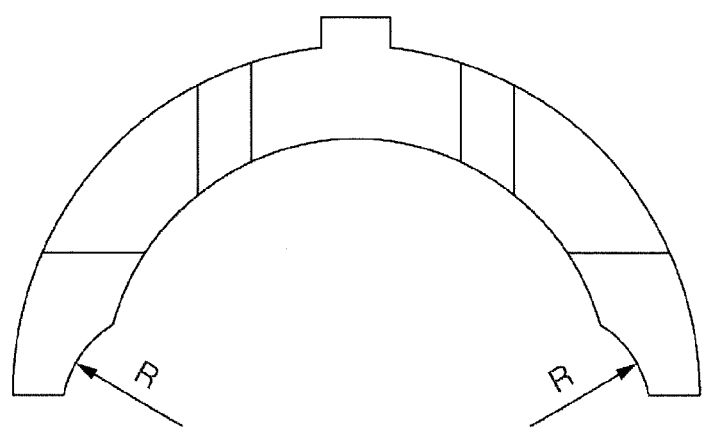
FIG. 9 is a front view of a thrust relief of another embodiment.
Figure 10:
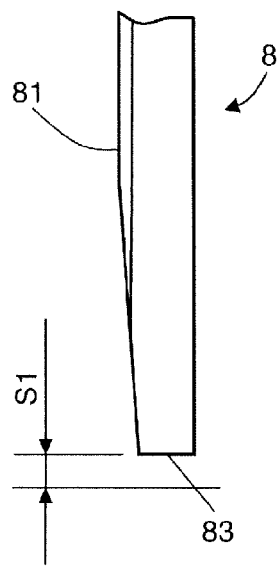
FIG. 10 is a side view of a thrust relief of still another embodiment.

For example, as illustrated in FIGS. 9 and 10, the present invention can be also applied to the half thrust bearing including a protruded portion which protrudes outward in the radial direction for the purpose of positioning and stopping rotation. Further, the length in the circumferential direction of the half thrust bearing can be also made shorter than the ordinary half thrust bearing 8 or the like shown in embodiment 1 by a predetermined length S1. Further, in the half thrust bearing, the inner circumferential surface may be cut out into a circular arc shape with a radius R in a vicinity of the end portion in the circumferential direction.

Likewise, chamfers may be also formed along the circumferential direction at the edge portion of the outer side and the edge portion at the inner side in the radial direction on the slide surface side of the half thrust bearing 8. In that case, the thrust relief length L1 at the inside end portion is expressed by the thrust relief length at the inner diameter side end portion of the half thrust bearing in the case where the chamfer is not formed.

Figure 11:
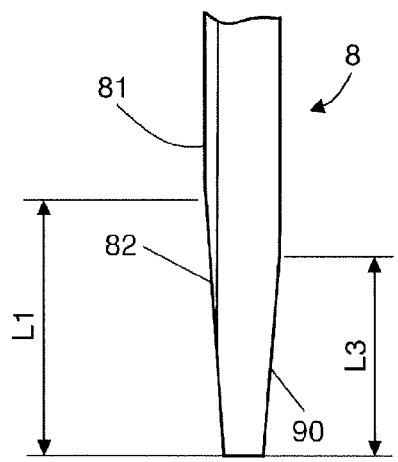
FIG. 11 is a side view of a thrust relief of still another embodiment.

As illustrated in FIG. 11, the half thrust bearing 8 may also include back surface reliefs 90 which each have a shape similar to the thrust relief at both circumferential end portions of a back surface (the back metal layer) on an opposite side to the slide surface 81. Alternatively, as illustrated in FIG. 12, the back surface relief 90 may be configured to have a plane parallel with the slide surface 81.

Figure 12:
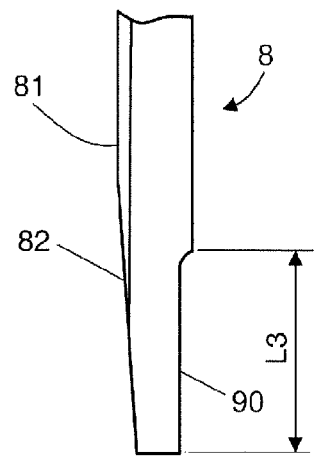
FIG. 12 is a side view of a thrust relief of still another embodiment.
Figure 13:
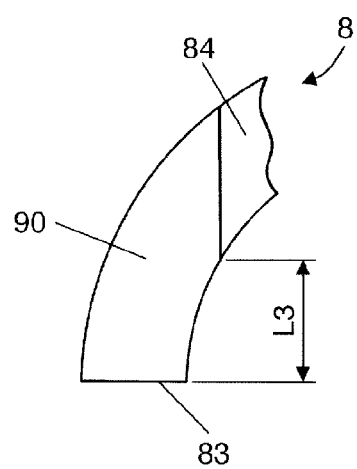
FIG. 13 is a front view of a relief of still another embodiment.

In FIGS. 11 and 12, a length L3 of the back surface relief 90 is smaller than the thrust relief length L1 of the aforementioned thrust relief 82, however, the length L3 is not limited to this, and the length L3 of the back surface relief 90 and the thrust relief length L1 may be the same, or the length L3 of the back surface relief 90 may be larger than the thrust relief length L1. Further, as illustrated in FIG. 13, the back surface relief 90 may be formed to extend in a perpendicular direction to the circumferential end surface 83 from the inside end portion in the radial direction of the half thrust bearing 8 to open to the outside end portion in the radial direction of the half thrust bearing 8.

Further, in the above described embodiment, although the four half thrust bearings 8 are used in the bearing device 1, the present invention is not limited to this, and a desired effect can be obtained by at least one of the half thrust bearings 8 according to the present invention. Further, the half thrust bearing 8 according to the present invention and the conventional thrust bearing may be paired and used as a ring-shaped thrust bearing. Furthermore, in the bearing device 1 of the present invention, the half thrust bearing(s) 8 may be formed integrally with one or both of the axial end surfaces of the half bearing 7 which rotatably supports the crankshaft.

Figure 14:
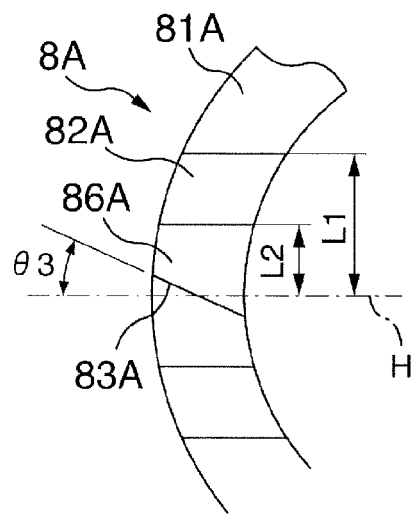
FIG. 14 is a front view of a thrust relief of still another embodiment.

Further, in order to prevent erroneous assembly, circumferential end surfaces of the respective half thrust bearings 8A may be formed as inclined end surfaces 83A as illustrated in FIG. 14 in one of two butting portions of the pair of half thrust bearings 8A, and thereby the butting portions of the inclined end surfaces can be made. In this case, the inclined end surface 83A is formed by being inclined by a predetermined angle θ3 with respect to a plane (an actual split plane H) including the other circumferential end surface which is not inclined. Alternatively, the respective circumferential end surfaces may be formed into other shapes such as corresponding recessed and protruded shapes, instead of the inclined end surfaces 83A.

However, in any case, a person skilled in the art will understand that the thrust relief length L1 is defined as a length in the perpendicular direction from the actual split plane H to a point at which a surface of a thrust relief 82A intersects an inner circumferential edge of a slide surface 81A.

The invention claimed is:

1. A half thrust bearing having a semicircular-ring shape for receiving axial force of a crankshaft of an internal combustion engine, comprising a back metal layer made from an Fe alloy and a bearing alloy layer, the bearing alloy layer comprising a slide surface on an opposite side to the back metal layer, thrust reliefs being formed adjacently to both circumferential end surfaces of the half thrust bearing, each thrust relief comprising a flat surface formed so that a wall thickness of the half thrust bearing becomes thinner from the slide surface toward the circumferential end surface, wherein a thrust relief length (L1) of each thrust relief at an inside end portion in a radial direction of the half thrust bearing extends in the range of a circumferential angle (θ1) more than 25° and less than or equal to 45° from the circumferential end surface toward a circumferential central portion of the half thrust bearing,
 the thrust relief length (L1) is constant between the inside end portion and an outside end portion in the radial direction of the half thrust bearing,
 the surface of each thrust relief comprises a first region on a side of the circumferential end surface and a second region on a side of the circumferential central portion, the first region consisting of a surface on which the back metal layer is exposed, the second region consisting of a surface on which the bearing alloy layer is exposed, a length (L2) of the first region from the circumferential end surface that is parallel with the thrust relief length (L1) is 8 mm to 18 mm.

2. The half thrust bearing according to claim 1, wherein the thrust relief length (L1) is 1.7 to 2.3 times the length (L2) of the first region.

3. The half thrust bearing according to claim 1, wherein an angle ($\theta 2$) formed by the slide surface and the surface of the thrust relief is 0.5° to 2°.

4. The half thrust bearing according to claim 1, wherein an overlay layer is coated on the slide surface and the surface of the thrust relief.

5. A bearing device for a crankshaft of an internal combustion engine, comprising:
   a crankshaft;
   a pair of half bearings which supports a journal portion of the crankshaft, each half bearing comprising crush reliefs formed on its inner circumferential surface adjacently to both circumferential end portions of the half bearing;
   a bearing housing in which a holding hole for holding the pair of half bearings is formed so as to penetrate through the bearing housing; and
   at least one half thrust bearing having semicircular-ring shape according to claim 1, the half thrust bearing being arranged on an axial end surface of the bearing housing adjacently to the holding hole for receiving axial force of the crankshaft, wherein
   at least the thrust relief of the half thrust bearing on a rear side in a rotational direction of the crankshaft is formed so that the thrust relief length at the inside end portion in the radial direction of the half thrust bearing is longer than a crush relief length at a corresponding axial end portion of the half bearing.

6. The bearing device according to claim 5, wherein at least the thrust relief of the half thrust bearing on the rear side in the rotational direction of the crankshaft is formed so that a sectional area of a thrust relief clearance in the radial direction at the inside end portion in the radial direction of the half thrust bearing is larger than a sectional area of the crush relief clearance in the radial direction at the end portion in the axial direction of the corresponding half bearing.

7. The bearing device according to claim 5, wherein the thrust relief length of the half thrust bearing at the inside end portion in the radial direction is 1.5 times the crush relief length at the end portion in the axial direction of the corresponding half bearing.

* * * * *